(12) United States Patent
Harrer

(10) Patent No.: US 7,316,071 B2
(45) Date of Patent: Jan. 8, 2008

(54) POSITION MEASURING SYSTEM

(75) Inventor: Helmut Harrer, Waldkraiburg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/821,628

(22) Filed: Apr. 9, 2004

(65) Prior Publication Data

US 2004/0244210 A1 Dec. 9, 2004

(30) Foreign Application Priority Data

Apr. 11, 2003 (DE) ............... 103 16 870

(51) Int. Cl.
*G01D 21/00* (2006.01)
(52) U.S. Cl. ............ 33/1 PT; 33/1 N; 33/1 L
(58) Field of Classification Search .......... 33/1 PT, 33/1 N, 534, 1 L
See application file for complete search history.

(56) References Cited

U.S. PATENT DOCUMENTS

| 4,495,700 | A | * | 1/1985 | Ernst ............... 33/1 N |
| 4,922,069 | A | * | 5/1990 | Huizenga ............. 439/144 |
| 5,657,544 | A | * | 8/1997 | Ota et al. ............ 33/1 N |
| 6,257,907 | B1 | | 7/2001 | Feichtinger |
| 6,531,880 | B1 | * | 3/2003 | Schneider et al. ......... 324/539 |
| 6,617,571 | B2 | | 9/2003 | Thaler et al. |
| 6,688,006 | B2 | * | 2/2004 | Itomi ............ 33/1 N |
| 7,044,795 | B2 | * | 5/2006 | Diep ............ 439/610 |
| 2003/0019113 | A1 | * | 1/2003 | Kofink et al. ......... 33/1 PT |

FOREIGN PATENT DOCUMENTS

| DE | 42 41 020 A1 | 6/1994 |
| DE | 195 23 795 C1 | 12/1996 |
| DE | 195 43 372 A1 | 5/1997 |
| DE | 199 13 262 A1 | 9/2000 |
| DE | 100 31 302 A1 | 1/2002 |

* cited by examiner

*Primary Examiner*—Yaritza Guadalupe-McCall
(74) *Attorney, Agent, or Firm*—Brinks Hofer Gilson & Lione

(57) ABSTRACT

A position measuring system having a housing with a wall, the wall having an opening and including a deformation. A measurement device accommodated in the housing, the measurement device detects and/or processes measurement values and outputs a position-dependent measurement signal. A cable including a shield, wherein the cable is positioned within the opening and is electrically connected to the measurement device so as to carry the measurement signal. The deformation of the wall fixes the cable in the opening and for binding the shield to the housing.

11 Claims, 3 Drawing Sheets

POSITION MEASURING SYSTEM

Applicant claims, under 35 U.S.C. §119, the benefit of priority of the filing date of Apr. 11, 2003 of a German patent application, copy attached, Serial Number 103 16 870.2, filed on the aforementioned date, the entire contents of which is incorporated herein by reference.

BACKGROUND OF THE INVENTION

1. Field of the Invention

The present invention relates to a position measuring system.

2. Discussion of Related Art

Such position measuring systems are used to measure travel distances or angles of a moving component. To detect the motion of the component, a detector device is accommodated in protected fashion in a housing. Via a cable, the position-dependent electrical measurement signals are carried to the outside from the interior of the housing and conducted onward to a subsequent electronic unit for measurement value processing.

From German Patent Disclosure DE 195 43 372 A1, one such position measuring system is known, in the form of an angle measuring device. A sheath is crimped around the shielding mesh of the cable; this sheath engages in a fit and as a result forms a tension relief for the cable. The sheath and the fit are covered by a cap.

A disadvantage of this device is the requirement for a sheath around the shielding mesh and the lack of tightness in the cable leadthrough.

OBJECT AND SUMMARY OF THE INVENTION

An object of the present invention is to disclose a position measuring system in which a shielded electrical cable is fixed especially simply to a housing of the position measuring system.

This object is attained according to the present invention by a position measuring system having a housing with a wall, the wall having an opening and including a deformation. A measurement device accommodated in the housing, the measurement device detects and/or processes measurement values and outputs a position-dependent measurement signal. A cable including a shield, wherein the cable is positioned within the opening and is electrically connected to the measurement device so as to carry the measurement signal. The deformation of the wall fixes the cable in the opening and for binding the shield to the housing.

The opening in the wall of the housing through which the shielded cable is passed is reduced in size by a deformation of the wall or a crimping, thereby fixing the cable in the opening.

In a preferred embodiment, the shielding mesh is upended or turned back onto the jacket of the cable, and the deformation has a first portion in which there is no shielding mesh between the deformed wall of the housing and the jacket, and the deformation has a second portion in which the deformed wall of the housing contacts the upended or turned back shielding mesh.

This has the advantage that the first portion assures the tightness of the cable leadthrough, and the second portion assures the binding of the shield to the electrically conductive housing.

With the present invention, simple, space-saving fixation and shielding binding of the cable to the housing of the position measuring system are possible.

The present invention will be described in further detail in terms of exemplary embodiments in conjunction with the drawings.

DETAILED DESCRIPTION OF THE PREFERRED EMBODIMENTS

Figure 1:
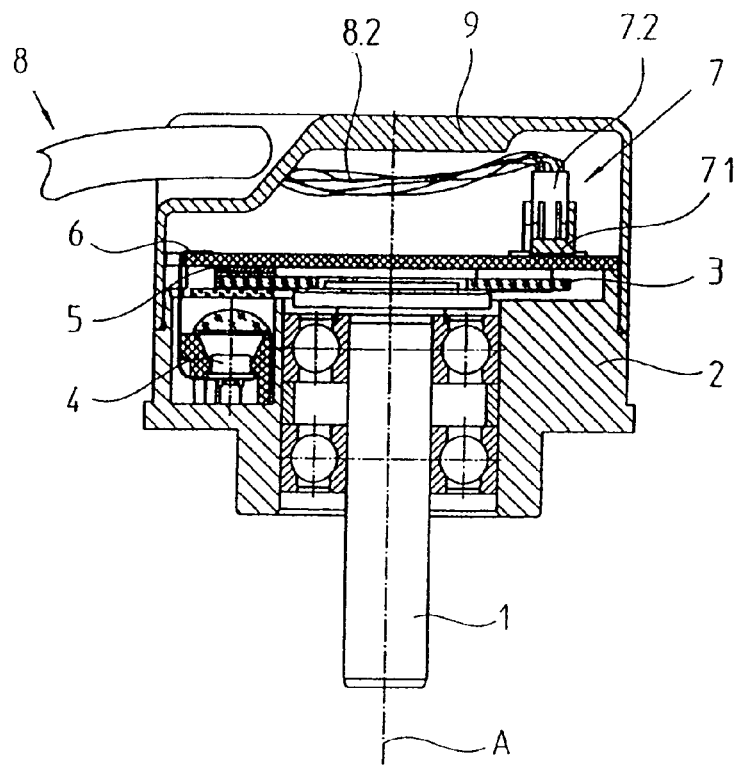
FIG. 1 is a cross-sectional view of an embodiment of an angle measuring device taken along an axis of a shaft of the angle measuring device in accordance with the present invention.

The position measuring systems shown in the drawings and described as examples here are angle measuring devices. These angle measuring devices have a shaft 1 for connection to a body to be measured, whose angular position is to be measured. The shaft 1 is rotatably supported in a base body 2—also called a stator or flange. For angle measurement, the shaft 1 is connected for instance to a motor shaft and the base body 2 to the motor housing that is stationary relative to it.

On the shaft 1, a code disk 3 with an incremental and/or absolute code is mounted in a manner fixed against relative rotation and can be scanned photoelectrically, magnetically, capacitively, or inductively. In the example, the code disk 3 is scanned photoelectrically. For this purpose, a light source 4 is used, which outputs a focus beam which is modulated as a function of position by the code disk 3. The modulated light reaches a measurement device, such as detector device 5, which is disposed on a printed circuit board 6. Also located on the printed circuit board 6 is the stationary part 7.1 of a plug connection 7. The corresponding part 7.2 of this plug connection 7 is secured to a cable 8 that leads to the outside.

Figure 2:
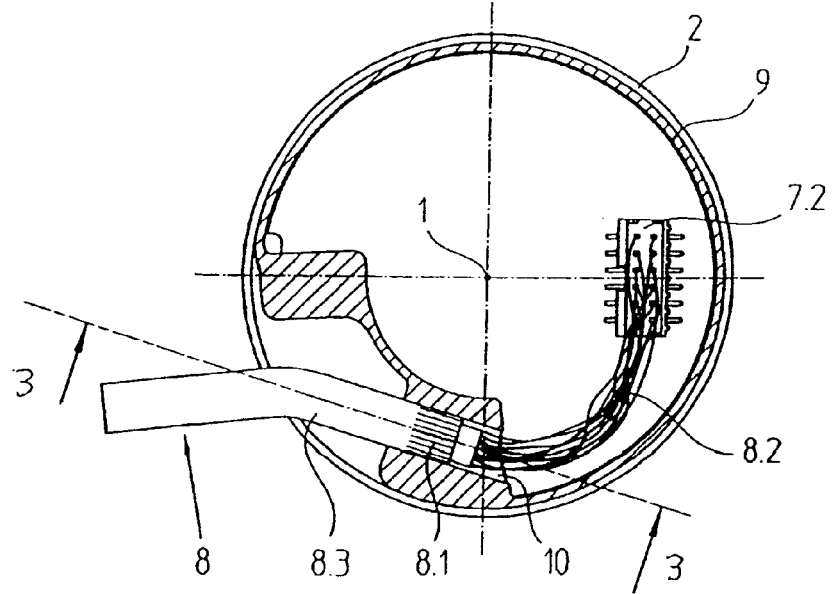
FIG. 2 is a cross-sectional view of the angle measuring device of FIG. 1 in the region of the cable leadthrough.

For protecting the detector device 5, there is a cylindrical or cup-shaped housing 9, which is closed on its face end and is secured over the circumference to the base body 2. Protection against electromagnetic interference is assured because the housing 9 comprises electrically conductive material and is in contact with the electrically conductive base body 2. The housing 9 and the base body 2 are connected, via a shield in the form of a shielding mesh 8.1 of the cable 8, to a reference potential for diversion of electrical charges. This connection is shown in detail in FIGS. 2-4.

An opening 10 extending transversely to the shaft axis A is made in the end wall 9.1 of the housing 9. The metal shield is disposed in the form of a shielding mesh 8.1 around signal lines 8.2 of the cable 8, and a plastic jacket 8.3 is located around the shielding mesh 8.1. The shielding mesh 8.1 is stripped bare over a short length, and the stripped portion is upended/turned rearward or folded over rearward onto the outer circumference of the jacket 8.3. In this state, the cable 8 is passed through the opening 10. The length of the opening 10 for receiving the cable 8 is selected such that, viewed in terms of its length from the outside toward the housing interior, it has a first portion L1, in which a region of the cable 8 without the upended or turned back shielding mesh 8.1 is located, and a following second portion L2, in which one region of the cable 8 with the upended or turned back shielding mesh 8.1 is located over the jacket 8.3.

By a plastic deformation, crimp or indentation 11 of the wall 9.1 of the housing 9, in both portions L1, L2 the opening 10 is reduced in diameter, and as a result the cable 8 is fixed in tension-proof fashion by positive engagement in the opening 10 of the housing 9. The first portion L1 guarantees a tight closure, since the wall 9.1 of the housing 9 directly contacts the elastic jacket 8.3 of the cable 8 over the entire circumference and thus securely seals off the opening 10. The second portion L2 guarantees a secure electrical contact of the shielding mesh 8.1 with the housing 9 and thus shielding of the housing 9 against electromagnetic interference. Damage to the signal lines 8.2 is prevented, since the deformation of the wall 9.1 in both portions L1, L2 is made by plastic deformation of the jacket 8.3.

Figure 3:
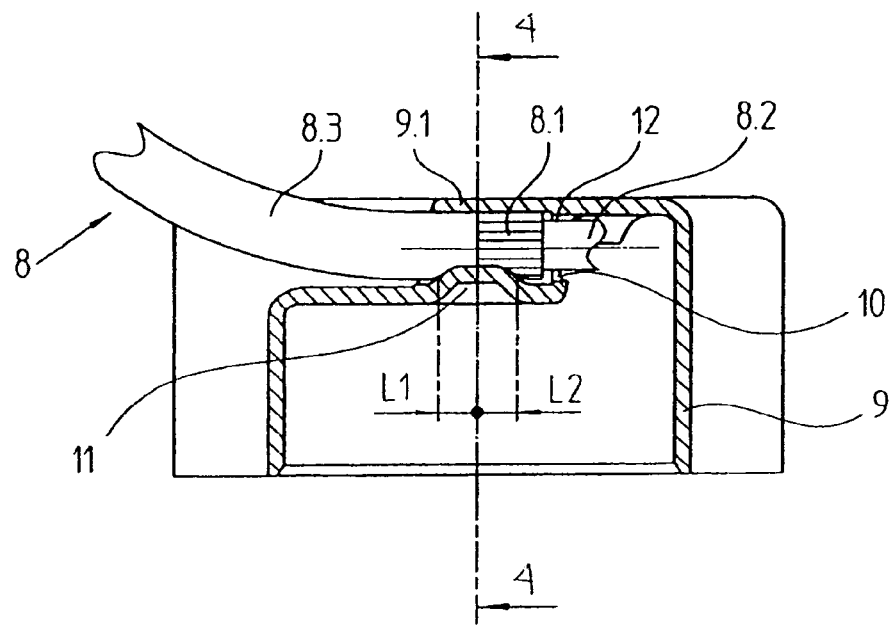
FIG. 3 is a cross-sectional view taken along line 3-3 of FIG. 2 of the housing of the angle measuring device of FIG. 2.

To simplify installation and for secure positioning of the cable 8 in the opening 10 prior to the deformation, a step 12 is made in the opening 10, as a stop for the end of the jacket 8.3, as shown in FIG. 3.

Figure 4:
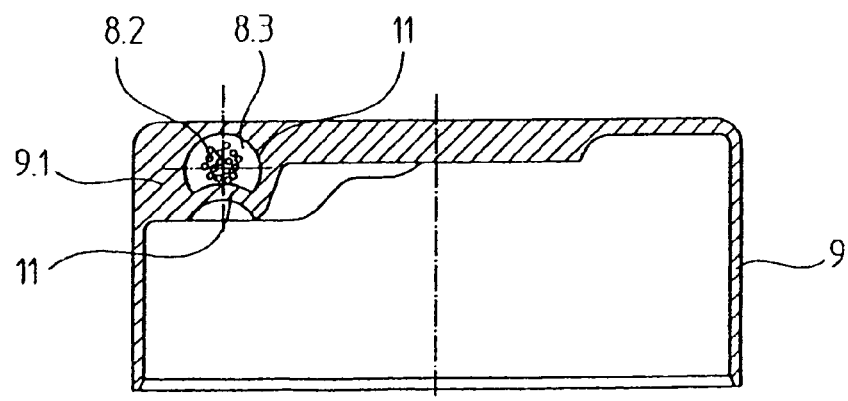
FIG. 4 is a cross-sectional taken along line 4-4 through the housing of FIG. 3.

As also particularly clearly shown in FIGS. 3 and 4, the end wall 9.1 that has the opening 10 is embodied with a greater thickness than the rest of the wall of the housing 9. The deformation 11 is made on one side by a half-round form as a bead, for the sake of a good flow of material. To improve the flow of material, the deformation 11 also has a chamfer at both the beginning and end in the longitudinal direction of the opening 10.

For an outer diameter of the jacket of the cable 8 of approximately 6 mm, a length of the deformation 11 of approximately 9 mm has proved good, in which case the first portion L1 has a length of approximately 6 mm and the second portion L2 has a length of approximately 3 mm.

The housing 9 is produced from electrically conductive metal, in particular aluminum or aluminum alloy, by extrusion or diecasting. The opening 10, in extrusion, is a bore made afterward by metal-cutting machining, while in diecasting it can be provided in the mold.

Figure 5:
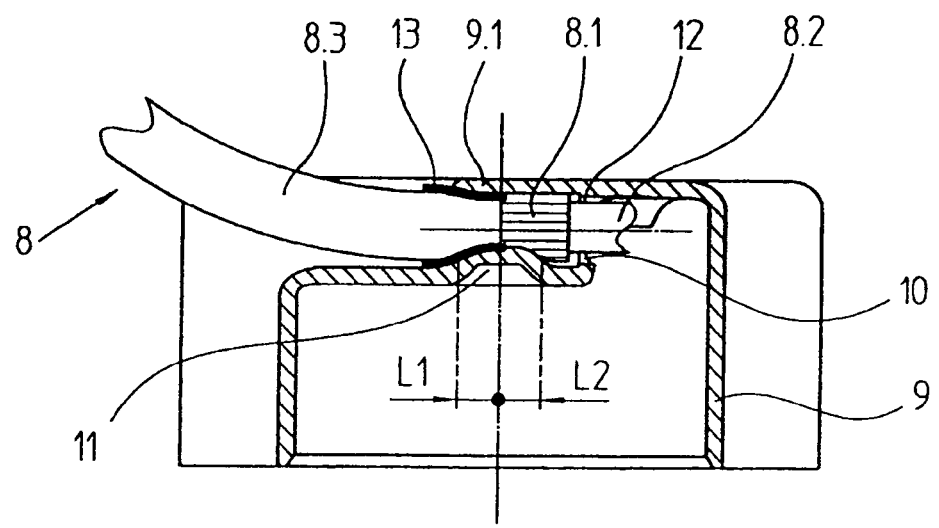
FIG. 5 is a cross-sectional view through the housing of a second embodiment of an angle measuring device in accordance with the present invention.

In FIG. 5, a modified version of the angle measuring device of FIGS. 1-4 is shown. Unlike the first angle measuring device of FIGS. 1-4, in this second angle measuring device, an adhesive 13 is additionally placed between the jacket 8.3 of the cable 8 and the housing 9. This adhesive 13 is advantageously provided over the entire circumference of the cable 8 in the opening 10 and assures even better sealing.

Figure 6:
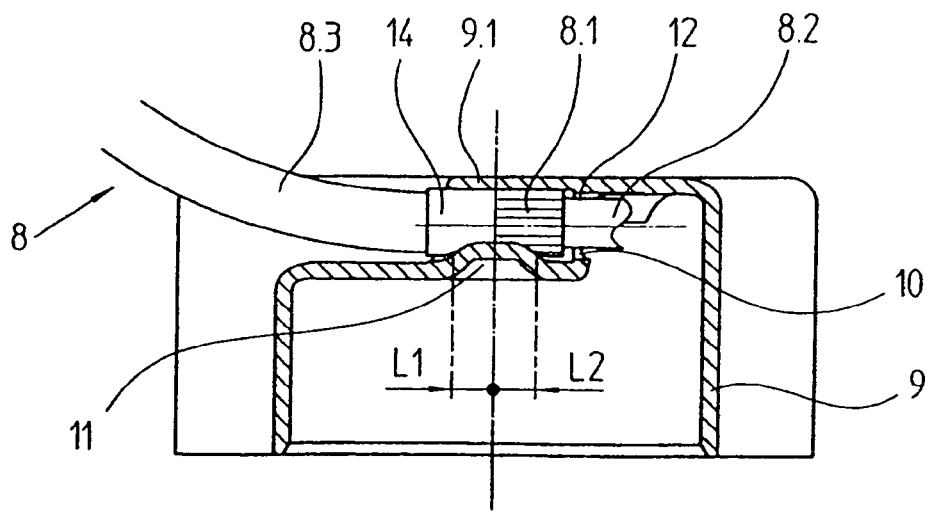
FIG. 6 is a cross-sectional view through the housing of a third embodiment of an angle measuring device in accordance with the present invention.

In FIG. 6, a further modification of the angle measuring device of FIGS. 1-4 is shown. In a distinction from the first angle measuring device of FIGS. 1-4, in this third angle measuring device there is an elastic intermediate ply 14, for instance in the form of a rubber hose, between the jacket 8.3 of the cable 8 and the housing 9. This intermediate ply 14 is thrust over the jacket 8.3 and partially under the upended or turned back shield 8.1. The advantage of this kind of intermediate ply 14 is that an elastic deformation and thus good tightness are assured by a suitable choice of material for the intermediate ply 14. The tightness is thus not exclusively dependent on the deformability of the jacket 8.3 of the cable 8.

In all the exemplary embodiments shown in FIGS. 1-6, instead of the radial course of the cable 8 shown, an axial course of the cable 8 can be provided, by embodying one side wall of the housing in a swelled form and making an axially extending opening in this swelling of material for receiving and fixing the cable. The versions described at length and this alternative version have the advantage of a space-saving arrangement that does not enlarge the radial circumference of the housing, which is advantageous particularly for building the angle measuring device into the tubular interior of a housing of an electric motor.

The housing can also be a component of a scanning arrangement of a length measuring instrument. Then the housing can cover a device for detecting measurement values either in the form of a detector arrangement, or only in the form of an evaluation device for processing scanning signals of a detector arrangement disposed outside the housing.

Besides the exemplary embodiments described, it is understood that alternative variants also exist within the scope of the present invention.

I claim:

1. A position measuring system, comprising:
   a housing comprising a wall, said wall having an opening and comprising an integral deformation;
   a measurement device accommodated in said housing, said measurement device detects and/or processes measurement values and outputs a position-dependent measurement signal;
   a shielded cable comprising a shield around signal lines for preventing electro-magnetic interference, wherein said cable is positioned within said opening and said signal lines are electrically connected to said measurement device so as to carry said measurement signal; and
   wherein said deformation of said wall fixes said cable in said opening and binds said shield to said housing so as to provide a secure electrical contact between said shield and said housing.

2. The position measuring system of claim 1, further comprising a jacket that surrounds said shield; and
   said shield surrounds said signal lines, and said shield in said opening is in electrical contact with said housing.

3. The position measuring system of claim 2, wherein said deformation extends along a direction extending in terms of its length from a position exterior of said housing to a position within said housing, said deformation comprises:
   a first portion in which said wall does not contact said shield; and
   a second portion in which said wall contacts said shield.

4. The position measuring system of claim 3, wherein in said first portion, said wall directly contacts and surrounds an entire circumference of said jacket.

5. The position measuring system of claim 4, wherein in said second portion, said shield is upended/turned back onto said jacket.

6. The position measuring system of claim 3, further comprising an elastic intermediate ply provided in said opening between said shielded cable and said housing; and
   wherein in said first portion, said wall directly contacts and surrounds an entire circumference of said intermediate ply, and in said second portion, said shield is upended/turned back onto said intermediate ply.

7. The position measuring system of claim 1, further comprising an adhesive provided in said opening between said shielded cable and said housing.

8. The position measuring system of claim 1, further comprising an elastic intermediate ply provided in said opening between said shielded cable and said housing.

9. The position measuring system of claim 1, wherein said housing is embodied cylindrically with an end wall and a code disk that measures angles and contains a detector device that scans the code disk.

10. The position measuring system of claim 9, wherein said opening extends transversely to a longitudinal axis of said housing and is disposed on said end wall.

11. The position measuring system of claim 10, wherein said end wall, in a region of said opening, has a swelling of material.

* * * * *